(12) United States Patent
Nydegger et al.

(10) Patent No.: US 11,268,487 B1
(45) Date of Patent: Mar. 8, 2022

(54) ENERGY BALANCED SYSTEM FOR GENERATING ELECTRIC POWER

(71) Applicant: EP Transfer Systems LLC, Rancho Santa Fe, CA (US)

(72) Inventors: Neil K. Nydegger, Rancho Santa Fe, CA (US); Ernest William Townsend, IV, Scottsdale, AZ (US)

( * ) Notice: Subject to any disclaimer, the term of this patent is extended or adjusted under 35 U.S.C. 154(b) by 0 days.

(21) Appl. No.: 17/118,012

(22) Filed: Dec. 10, 2020

(51) Int. Cl.
*F03B 13/06* (2006.01)

(52) U.S. Cl.
CPC .................................. *F03B 13/06* (2013.01)

(58) Field of Classification Search
CPC ............................... F03B 13/06; F04B 45/02
See application file for complete search history.

(56) References Cited

U.S. PATENT DOCUMENTS

| 4,155,224 | A | 5/1979 | Hopping |
| 8,015,807 | B1 | 9/2011 | Akutsu |
| 8,516,812 | B2 | 8/2013 | Manakkattupadeettathil |
| 2009/0165640 | A1* | 7/2009 | Kawasaki ............... F04B 1/141 91/169 |

* cited by examiner

*Primary Examiner* — Viet P Nguyen
(74) *Attorney, Agent, or Firm* — Neil K. Nydegger, Esq.

(57) ABSTRACT

In accordance with the present invention an apparatus is provided to maintain separate upper and lower water levels in a bi-level tank. The purpose here is to maintain tank configurations for the water portion of an air/water pathway in the tank that will be followed by a buoyant power module during its electricity generating work cycle. During an operation, the module enters the tank and raises the lower water level. The apparatus is then expanded to displace a volume of water in the tank with a volume of air, which raises the upper water level. Subsequently, when the module leaves the tank, the upper water level is lowered. Further, the apparatus is collapsed to drop the lower water level back to its original level in the tank. Thus, the bi-level tank is reconfigured to receive another module, for another duty cycle.

10 Claims, 4 Drawing Sheets

ENERGY BALANCED SYSTEM FOR GENERATING ELECTRIC POWER

FIELD OF THE INVENTION

The present invention pertains generally to systems that operate by using renewable energy from the earth's gravitational field. More particularly, the present invention pertains to systems and methods for employing the effect of gravity on a power module as it falls through air to generate electricity, and the effect of the module's buoyancy as it rises through water to an elevated start point for a subsequent work cycle. The present invention is particularly, but not exclusively, useful for maintaining two different water levels in a bi-level tank to establish the water portion of an air/water pathway for a power module during its work cycle.

BACKGROUND OF THE INVENTION

A displacement device disclosed for the present invention is intended primarily, but not exclusively, for use as a mechanism to operate a bi-level tank. As envisioned for the present invention, a bi-level tank will preferably have a structure such as is disclosed in U.S. patent application Ser. No. 16/788,683, which was filed on Feb. 12, 2020, by Townsend for an invention entitled "Machine for Driving an Electric Generator" (hereinafter referred to as the "Machine").

In overview, as disclosed in the '683 Application, the Machine moves a power module(s) along a vertically oriented air/water pathway. On the air portion of the pathway, the power module engages with a linear electric generator and falls under the influence of gravity to generate electric energy. The power module then falls into a bi-level water tank where it is directed along the water portion of the pathway. In the water tank, the power module is raised by its buoyancy back to an elevated start point where it begins another cycle.

Briefly, the bi-level tank of the Machine includes both an upper "tower tank" and a lower "transfer tank". Different water levels for the upper and lower tanks are maintained by the operation of a valving system in the bi-level tank. This valving system also allows the tanks to be either connected in fluid communication with each other or, alternatively, isolated from each other. Importantly, during these changeover operations, the tanks are connected in fluid communication with each other only during the time that is needed for a power module to transit through the lower "transfer tank". Once the module leaves the lower tank and enters the upper tank, the upper and lower tanks are again isolated from each other. During the event, water levels in the respective upper and lower tanks must be controlled. For the present invention, this control is established by a water displacement device that accounts for the passage of a power module through the lower tank.

An operation of a displacement device for the Machine will be best appreciated by considering what must be accomplished during the passage of a power module through the lower tank. Of particular importance, is the need for its control over the water level in the lower tank. Specifically, as a power module falls into the lower tank, the upper and lower tanks are isolated from each other and the water level in the lower tank rises. At the same time, access into the lower tank is sealed and closed behind the power module. As the power module passes along an unobstructed water pathway into the upper tank, water from the upper tank replaces the water volume previously occupied by the power module in the lower tank. The water level in the lower tank, however, does not drop because the lower tank has remained closed. Note: as the power module transited the lower tank, the displacement device was activated to displace a volume of water from the lower tank and move it into the upper tank. Thus, once the module has vacated the lower tank the water level in the lower tank will be lowered. Nevertheless, the valving system in the bi-level tank is operated to isolate the lower tank from the upper tank. The displacement device can then be deactivated to lower the water level in the lower tank for receiving the next module.

To control the separate water levels of the upper and lower tanks in the bi-level tank, it is necessary for the displacement device to cyclically lift a large volume of water from the lower tank, and into the upper tank. This lifting is done under very high pressures from water in the upper tank, and it must be accomplished within a relatively short period of time (e.g. several seconds). In effect, the work required to lift this water is the preponderance of the input power required to operate the Machine. On the other hand, as a separate consideration, the output power of the Machine comes from an interactive engagement of the power module with a linear electric generator as the module falls through air outside the bi-level tank.

Both the input and output power requirements for operating the Machine will be best appreciated by identifying the physical aspects that are involved with its operation. Of particular importance is the relationship between the input power provided by the displacement device, and the output power generated by a power module. In this context, the forces of gravity and buoyancy dominate for determining the resultant output power.

First, with specific regard to the power module and the output power of the Machine, the relationship between gravity and buoyancy is important. Buoyancy is a force that does not nullify the force of gravity. Buoyancy and gravity do, however, act on the power module in directly opposite directions. This relationship is typically quantified by a so-called buoyancy factor B. Mathematically, B equals the weight (mass) of an object relative to the weight (mass) of a same volume of the medium (e.g. water or air) in which it is submerged. In the context of the present invention, a power module will have a different B when falling through air while engaged with a linear generator, than when it is submerged in the bi-level tank of the Machine. For purposes of the present invention, the module's buoyancy factor B in air is considered negligible (i.e. B>>1). In water, however, for disclosure purposes only, B is considered equal to 0.7.

Another physical consideration of great importance for the present invention is the First Law of Thermodynamics. Simply stated, the First Law requires that the total energy in a closed system can be neither created nor destroyed. The present invention, however, is not a closed system and therefore the First Law is not a concern. This is so merely because the Machine requires an input power for its operation.

As a practical matter, it happens that the present invention incorporates two different energy systems. One system, in effect, drives the other. Specifically, one energy system involves the work that is done by a power module to generate an output power under the influence of the forces of gravity and buoyancy. The other involves the work that is cyclically done by the displacement device to reconfigure the bi-level tank with a water pathway for the power module as it transits through the bi-level tank. Neither the first energy system nor the second energy system can be considered as a closed system.

Although they operate separately, both the first and second energy systems can be evaluated within the same time interval $\Delta t$. For purposes of the present invention, $\Delta t$ is defined by the interval of time required for a displacement device to complete a duty cycle. Thus, $\Delta t$ is defined in the operational context of an operation of the displacement device. Nevertheless, $\lambda t$ must also be considered in the operational context of the power module. Specifically, the power module must remain engaged and work with the electric generator continuously through the entire time interval $\Delta t$.

For purposes of this disclosure, a volume of water, $V_w$, in the bi-level tank is determined based on the displacement volume of a power module, $V_m$. Thus, they are equal to each other ($V_w=V_m$). The mass, $m_m$, of the module volume $V_m$, however, is less than the water mass mw of the water volume $V_w$. This is quantified by the module's buoyancy factor B (i.e. $m_m=Bm_w$). In accordance with this relationship, the mass of the water volume $V_m$ will hereinafter be referred to merely as "m", and the mass of the module will be referred to as "Bm". It then follows that for the present invention, the energy in a volume of water will be equal to mgH, where g is the effect of gravity and H is a head height distance which is established by the water level in the upper tank of the bi-level tank. Similarly, the energy in a power module will be considered equal to BmgH.

Power is defined as work, U, per unit of time. Thus, the input power to operate the displacement device is $U/\Delta t=mgH/\Delta t$, and the output power generated by a power module is $BmgH/\Delta t$.

With the above in mind, it is an object of the present invention to provide a displacement device that will maintain different water levels in a bi-level tank for the purpose of establishing a water pathway on which a power module can transit by its buoyancy to an elevated start (launch) point from where it can be dropped to generate electricity under the influence of gravity. It is another object of the present invention to provide a system by which the output power of the Machine is developed by an output energy system, and the input power for running the Machine is developed by a separate input energy system. Yet another object of the present invention is to provide an apparatus for driving a Machine that will generate electricity under the influence of the forces of gravity and buoyancy, and which is easily manufacturable, is simple to use, and is cost effective.

SUMMARY OF THE INVENTION

A displacement device is provided for driving a Machine that has a pneumatic component, a mechanical component, an hydraulic component and an electromagnetic component. Of these components, the focus for the displacement device of the present invention is on the combination of the pneumatic and mechanical components which establish an input energy system.

Structurally, the displacement device includes, in sequence, a skirt (enclosure), a piston plate, a bellows, an exhaust chamber, a receiver tank for holding high-pressure compressed air, and an air compressor. Functionally, compressed air from the receiver tank is pulsed through the bellows to push upwardly against the underside of the piston plate, and thereby expand the skirt. The pulse of compressed air below the piston plate is then exhausted to the atmosphere to lower the piston plate for a next duty cycle.

The skirt (enclosure) of the displacement device is preferably made of a flexible, non-stretchable, material which will allow it to expand radially outwardly from a central axis that is defined by the cylindrical shape of the skirt. The upper end of the skirt is affixed to an inside wall of a water tank, and the lower end of the skirt is attached to the perimeter of the piston plate. In this combination, a skirt volume $V_s$ is created within the skirt between the inside wall of the water tank and the piston plate. This skirt volume $V_s$ is then filled with water having a predetermined pressure H. Importantly, both the skirt volume $V_s$ and the pressure H remain constant during an operation of the displacement device.

In detail, the piston plate has an upper surface with a circular flat plate area A that is surrounded by the plate's perimeter. The underside of the piston plate also has an area A that is surrounded by the plate's perimeter. In its connection with the skirt, the piston plate defines an axis which is essentially coaxial with the central axis of the skirt.

The cylindrical shaped bellows of the displacement device has a hollow interior and open ends. The upper end of the bellows is connected to the perimeter of the piston plate with the underside of the piston plate facing into the hollow interior of the bellows. Also, the open lower end of the bellows is connected directly in fluid communication with the exhaust chamber. In this combination, the bellows is coaxially aligned with the piston plate and due to the axially directed flexibility of the bellows, the piston plate is able to move in an axial direction either away from or toward the exhaust chamber. Specifically, it is to be appreciated that as the piston plate is raised to move away from the exhaust chamber and toward the skirt, it will reconfigure the skirt with a radially outward expansion. On the other hand, when the piston plate is lowered to move in the direction toward the exhaust chamber, it will reconfigure the skirt to a generally cylindrical shape.

During sequential duty cycles of the displacement device, an air compressor operates continuously to maintain an elevated pressure for compressed air in the receiver tank. Importantly, this elevated pressure is within a pressure range equal to H'±, where H'± is greater than the pressure H in the skirt volume $V_s$ noted above. This is important because during each duty cycle of the displacement device, a predetermined volume of compressed air $\Delta V_c$ is pulsed from the receiver tank and into the exhaust chamber. From the exhaust chamber, this pulse of compressed air is directed onward through the bellows and against the underside of the piston plate to perform the work that is required by the piston plate to lift the predetermined volume of water $V_w$ in the bi-level tank. Specifically, as noted above, the volume of water to be lifted in the bi-level tank $V_w$ is dimensionally the same as the volume of a power module $V_m$. Furthermore, the volume of compressed air $\Delta V_c$ that is pulsed from the receiver tank at a pressure H'± will also be equal to the volume $V_m$ of the power module ($\Delta V_c=V_w=V_m$).

The exhaust chamber of the displacement device is essentially the combination of a pressure valve and an exhaust valve which are located at the lower end of the bellows. Operationally, these valves are operated separately to be selectively OPEN or CLOSED in accordance with a predetermined schedule. According to this schedule, an elevated air pressure H' is established in the interior of the bellows against the underside of the piston plate when the pressure valve is OPEN and the exhaust valve is CLOSED. On the other hand, when the pressure valve is CLOSED and the exhaust valve is OPEN, the previously increased pressure against the underside of the piston plate is decreased to atmospheric pressure as air is exhausted from the exhaust chamber.

As mentioned above in the context of the Machine, the general purpose of the displacement device is to create and maintain a water pathway for a power module through the Machine's bi-level tank. This water pathway, however, is only a portion of a closed loop air/water pathway that is followed by a power module as it generates output electrical power for the Machine. It is an important consequence of the present invention that from an energy/power perspective, separate evaluations of input power and output power are possible. This is so because the displacement device and the power module interact independently of each other in the water of the bi-level tank, during a same duty cycle $\Delta t$.

As a separate consideration from an evaluation of the output power, the duty cycle $\Delta t$ of the displacement device to generate input power can be considered as having three phases. These phases are: i) a power phase during which the piston plate works to lift a volume of water; ii) a holding phase wherein the piston plate is held stationary at its raised location; and iii) an exhaust phase during which the piston plate is lowered to begin another duty cycle for the displacement device. It is important to keep in mind that this entire operation of the displacement device is accomplished absent any direct contact between the displacement device and a power module.

When considering an operation of the displacement device for the Machine, it is helpful to understand the assumptions that have been made. Specifically, these assumptions are:
1. No further work is done by the piston plate during the duty cycle $\Delta t$, after it has lifted water;
2. There is no transfer of energy between the displacement device and the power module in the bi-level tank; and
3. A power evaluation of dynamic considerations in the Machine, rather than static, steady-state conditions, is appropriate for evaluating the Machine's efficiency.

When considering energy and power, the work to be done by the piston plate during the duty cycle time interval $\Delta t$ of the displacement device equals mgH. Recall, the mass of water m is determined by the volume of water $V_w$ that is being lifted, g is the acceleration due to gravity, and H is the head height of the tower tank in the bi-level tank of the Machine. Also note, the head height H of the upper tank is the same H as is established for water in the skirt volume $V_s$ of the displacement device.

To do the work of the displacement device, the piston plate must be raised through a distance s, where $sA=V_w=V_m$. After being raised, the piston plate is then held stationary for a short interval of time, until the module has time to leave the lower tank and enter the upper tank. The piston plate is then lowered and reset for its next duty cycle. Although work is required to raise the piston plate, work is not required as the piston plate is held stationary, nor is work required as the piston plate is lowered to restart the next duty cycle.

As noted above, a receiver tank for holding compressed air at a pressure $H'\pm$ is selectively connected in fluid communication with the lower side of the piston plate. More specifically, this connection is provided by valves of the exhaust chamber that either; i) establish a direct pathway from the receiver tank to the lower side of the piston plate, or ii) separate the receiver tank from the exhaust chamber while compressed air in the exhaust chamber and bellows is held and then exhausted into the atmosphere. It is when there is an open pathway from the receiver tank to the piston plate that a pulse of compressed air can be taken from the receiver tank at a pressure $H'\pm>H$ to raise the piston plate. As noted above, the work required to raise the piston plate is equal to mgH. Importantly, this work is done during only a portion $1/x\Delta t$ of the displacement device duty cycle $\Delta t$, where $1/x<1$.

By definition, power is the time-rate of doing work. For purposes of the present invention, power requirements are considered separately for the input energy system and the output energy system. In the input energy system, consideration is given to the air compressor, the receiver tank, and the piston plate of the displacement device. The air compressor must do work at least equal to mgH during $\Delta t$. Thus, to maintain the pressure $H'\pm$ in the receiver tank, the air compressor must be operated continuously at a power equal to or greater than $mgH/\Delta t$. Recall, the piston plate of the displacement device must do the same amount of work mgH as the air compressor. The piston plate, however, does its work in response to pulses of compressed air from the receiver tank during only a portion of the duty cycle $\Delta t$ (e.g. $1/x\Delta t$). Specifically, as noted above, the piston plate works only as it lifts water in the bi-level tank. Thus, the piston plate operates with a power equal to $mgH/1/x\Delta t$. Stated differently, although the air compressor and the piston plate each do the same amount of work (mgH), the air compressor can work with less power for a longer period of time.

For the input energy system and for the output energy system, the same period of time $\Delta t$ is considered. The work harvested by the linear generator from the power module, however, will be dependent on the buoyancy factor B of the power module. Accordingly, the work harvested from the power module during $\Delta t$ is BmgH, and the output power will thus be $BmgH/\Delta t$.

The benefit of considering the air compressor with the piston plate, as the means for providing input power for the Machine, is three-fold. For one, although they do the same amount of work, the air compressor and the piston plate work through different intervals of time during the duty cycle $\Delta t$. For another, the work done by the air compressor and the receiver tank is directly transferred as work for operating the piston plate. For another, both the air compressor and the power module work continuously during the same duty cycle $\Delta t$.

By way of example, assume B=0.7 and that the portion of time $1/x\Delta t$ for raising the piston plate is $0.3\Delta t$. A mathematical calculation for net energy produced by the Machine requires only a comparison of output power (module)−input power (air compressor)=net power. In this example the result is:

$$0.7\ \mathrm{mgH}/(\Delta t) - 0.3\ \mathrm{mgH}/(\Delta t) = 0.4\ \mathrm{mgH}/(\Delta t)$$

for 40% net power

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
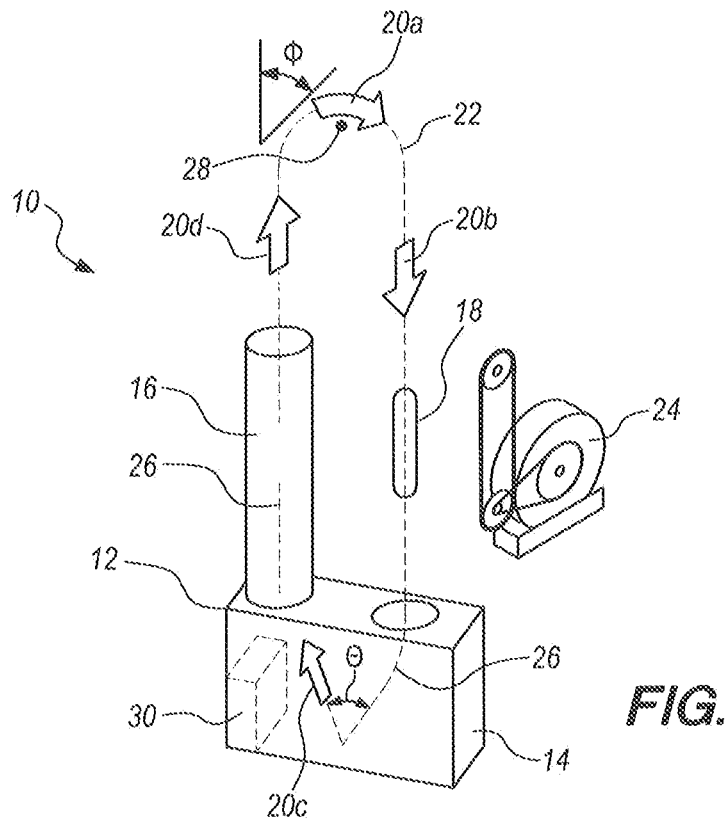
FIG. 1 is a conceptualized perspective view of a Machine for generating electricity in the earth's gravitational field with a submerged displacement device of the present invention shown in phantom for context location purposes only.

Referring initially to FIG. 1, a Machine to be driven by the present invention is shown and generally designated 10. As shown, the Machine 10 includes a bi-level tank 12 which has a lower tank 14 and an upper tank 16 that are connected for selective fluid communication with each other. FIG. 1 also shows a power module 18 that is intended to transit the bi-level tank 12 on a pathway 20 which is indicated by the arrows 20a-d. In more detail, the pathway 20 includes an air portion 22 where the power module 18 falls under the influence of gravity. As it falls the power module 18 engages with an electric generator 24 to generate electric power. FIG. 1 further shows that the pathway 20 also includes a water portion 26. On this water portion 26 of the pathway 20, the module 18 first decelerates and then returns by its buoyancy to an elevated start point 28 where it begins a next cycle. FIG. 1 also shows the intended location for a displacement device 30 of the present invention, i.e. submerged in the lower tank 14 of the bi-level tank 12.

Figure 2:
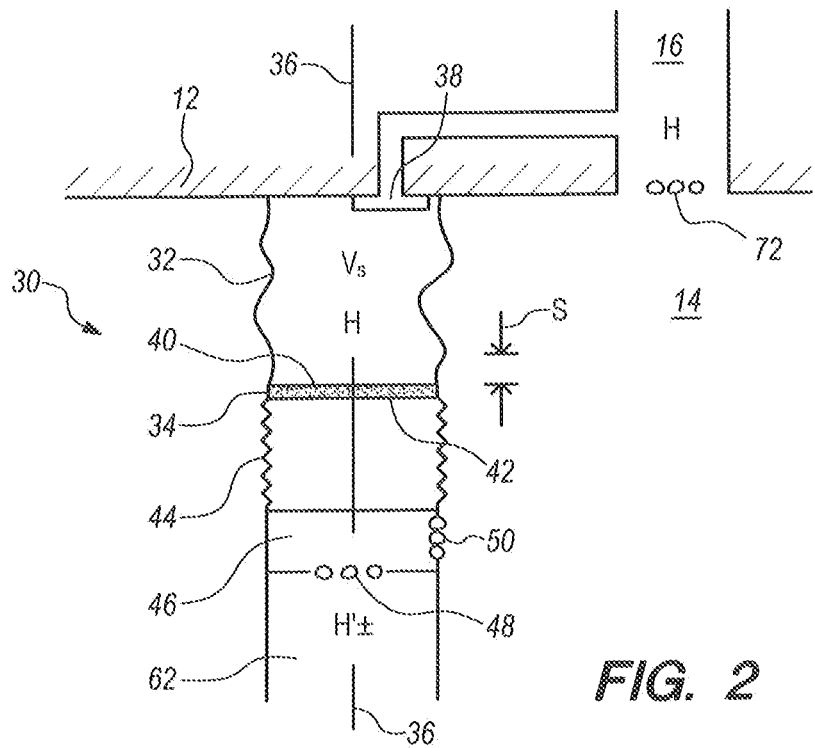
FIG. 2 is a cross section view of a displacement device in accordance with the present invention when configured at the beginning of its duty cycle $\Delta t$, wherein the pressure valve is OPEN and the exhaust valve is CLOSED to initiate a duty cycle $\Delta t$, at the time $t_0$.

FIG. 2 shows, in a cross-section view, that the displacement device 30 includes a skirt 32 (i.e. enclosure) which is connected between a wall of the bi-level tank 12 and a piston plate 34. Structurally, the skirt 32 is cylindrical shaped with open ends; it is centered on an axis 36; and it is preferably made of a flexible, impervious, non-stretchable material. Within the skirt 32 a skirt volume $V_s$ is established between the bi-level tank 12 and the piston plate 34. An important requirement of the skirt volume $V_s$ is that it maintains a constant volume, at a constant pressure, during an operation of the displacement device 30. As intended for the present invention, the constant pressure equal to H in the skirt volume Ve will be maintained by a pressure regulator 38, wherein H is the head height of water in the upper tank 16.

Still referring to FIG. 2, it is to be appreciated that the piston plate 34 has an upper surface 40 and an underside 42. Both the upper surface 40 and the underside 42 of the piston plate 34 have a substantially same plate area A, and the piston plate 34 is centered on the axis 36 for a coaxial alignment with the skirt 32. As shown, an open end of the skirt 32 is connected to the periphery around the area A on the upper surface 40 of the piston plate 34. Below the piston plate 34, its underside 42 is connected to a bellows 44.

The bellows 44 is a hollow cylindrical shaped structure with open ends. An upper end of the bellows 44 is connected to the periphery around the area A on the underside 42 of the piston plate 34. The lower end of the bellows 44 is connected to an exhaust chamber 46. With its connections between the piston plate 34 and the exhaust chamber 46, the bellows 44 is coaxially aligned with the skirt 32. Thus, with the action of the bellows 44, the piston plate 34 can be moved up and down along the axis 36 through the distance s shown in FIG. 2. For purposes of the present invention, it is important that the distance s be established so that a movement of the piston plate 34 will pass through a volume, sA, that is equal to the volume $V_m$ of a power module 18.

With specific reference to the exhaust chamber 46, FIG. 2 shows that the exhaust chamber 46 essentially includes a pressure valve 48 and an exhaust valve 50. The primary purpose of this exhaust chamber 46 is to control air pressures against the underside 42 of the piston plate 34 by operating the valves 48 and 50 in accordance with a predetermined protocol. In the disclosure provided below, the valves 48 and 50 are represented by three circles. Hereinafter, all OPEN valves are depicted in the Figures as a line of three circles. On the other hand, all CLOSED valves are depicted by three dots.

Figure 3:
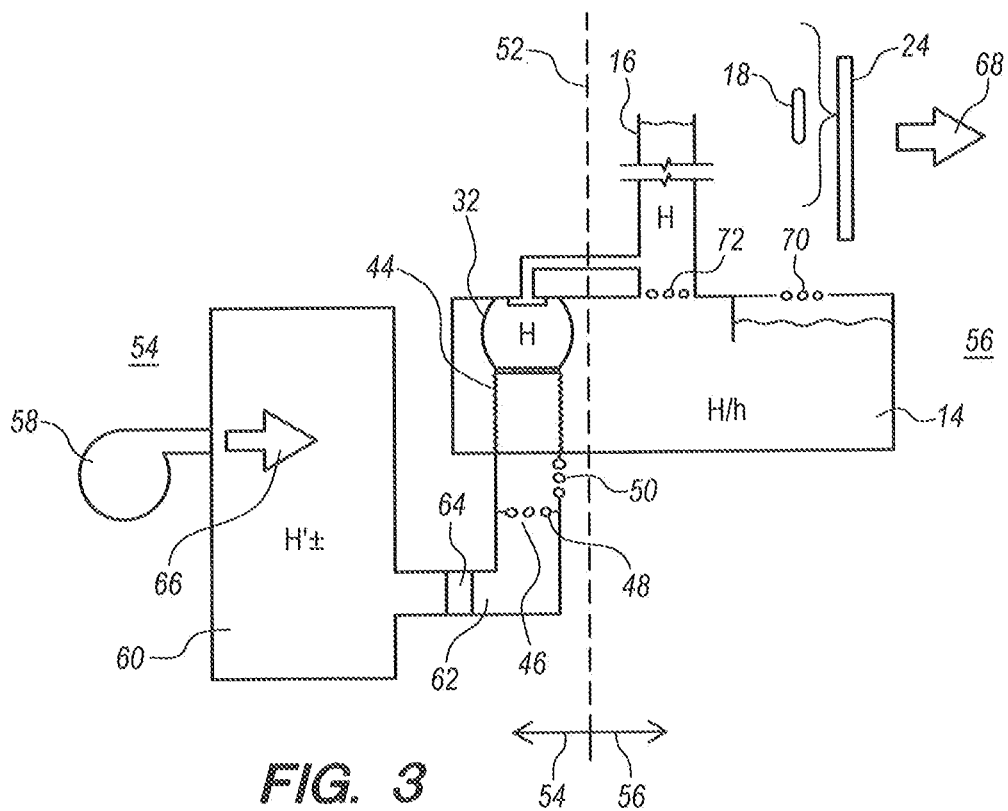
FIG. 3 is a diagrammatic view of components in the Machine, with the components separated into separate input and output energy systems.

FIG. 3 is a depiction of the present invention as two different energy systems, separated by a dashed line 52. To the left of the dashed line 52 is an input energy system generally designated 54, and to the right of the dashed line 52 is an output energy system generally designated 56. For the present invention, although they are interactive, the energy systems 54 and 56 are structurally and functionally considered individually. The only link between the two energy systems 54 and 56 is that both are partially submerged in a same body of water, i.e. the lower tank 14 of the bi-level tank 12. As noted above in the assumptions presented in the Summary of the Invention, the present invention assumes there is no transfer of energy between the input energy system 54 and the output energy system 56.

In FIG. 3, it is seen that the input energy system 54 includes an air compressor 58 that provides compressed air for a receiver tank 60. Further, it is shown that the receiver tank 60 is connected in fluid communication with the exhaust chamber 46 via pressure valve 48. As intended for the present invention, compressed air pressure in the receiver tank 60 is maintained within a pressure range H'± at all times. This pressure range H'± is monitored by a regulator 64 which is connected to, and controls, the operation of the air compressor 58. Specifically, the pressure range H'± must always be equal to or greater than the head height H in the upper tank 16, and in $V_s$ of the skirt 32.

It is also shown in FIG. 3 that the output energy system 56 essentially includes the bi-level tank 12, the power module 18 and the linear generator 24. In contrast with each other, the input energy system 54 provides an input power represented by the arrow 66, while the output energy system 56 provides an output power represented by the arrow 68. Obviously, the purpose of the present invention is to ensure that the output power 68 exceeds the input power 66. As recognized by the present invention, a valid comparison of these input and output powers 66/68 can be best understood by evaluating an operation of the displacement device 30.

Figure 4A:
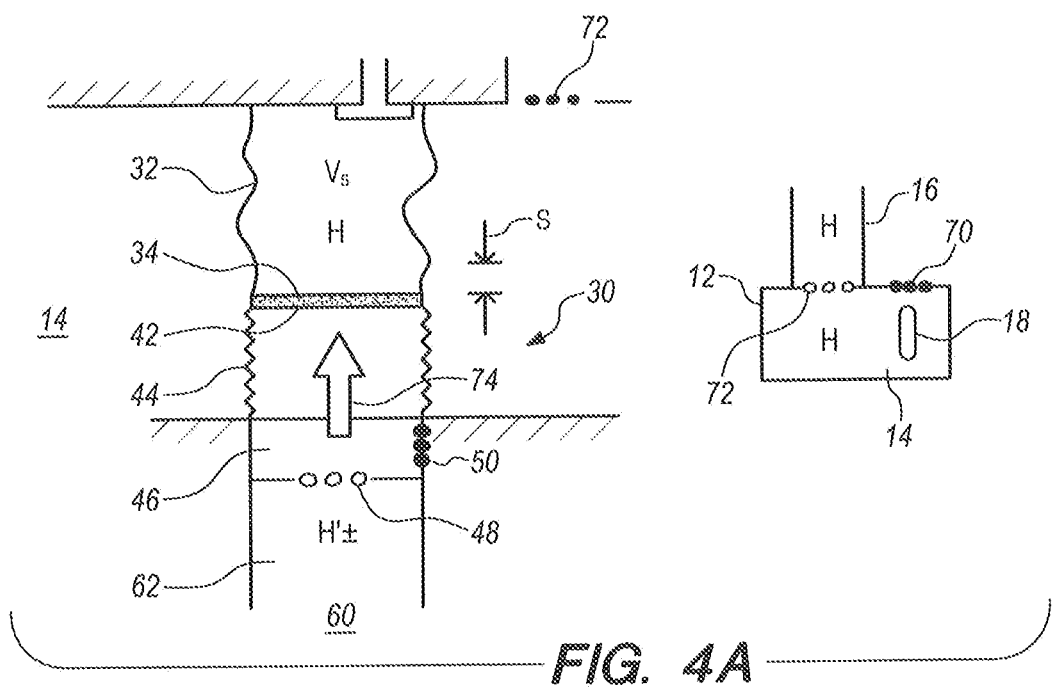
FIG. 4A-4C show sequential configurations for the displacement device during successive phases of a displacement device's duty cycle, namely, a power input phase (FIG. 4A), a holding phase (FIG. 4B), and an exhaust phase (FIG. 4C)
Figure 4B:
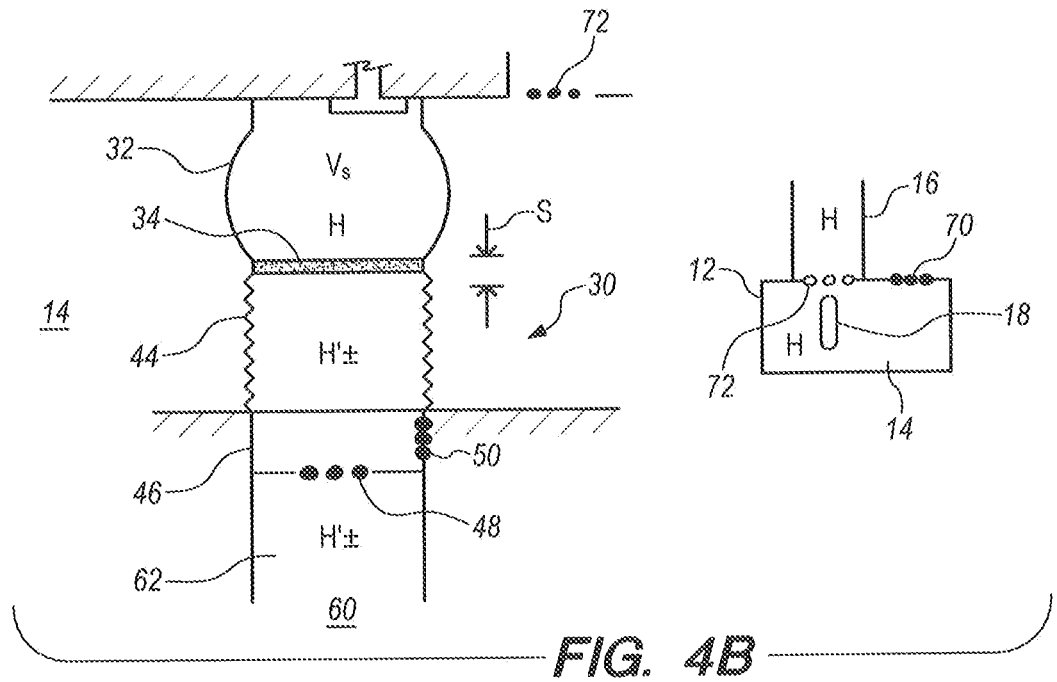
Figure 4C:
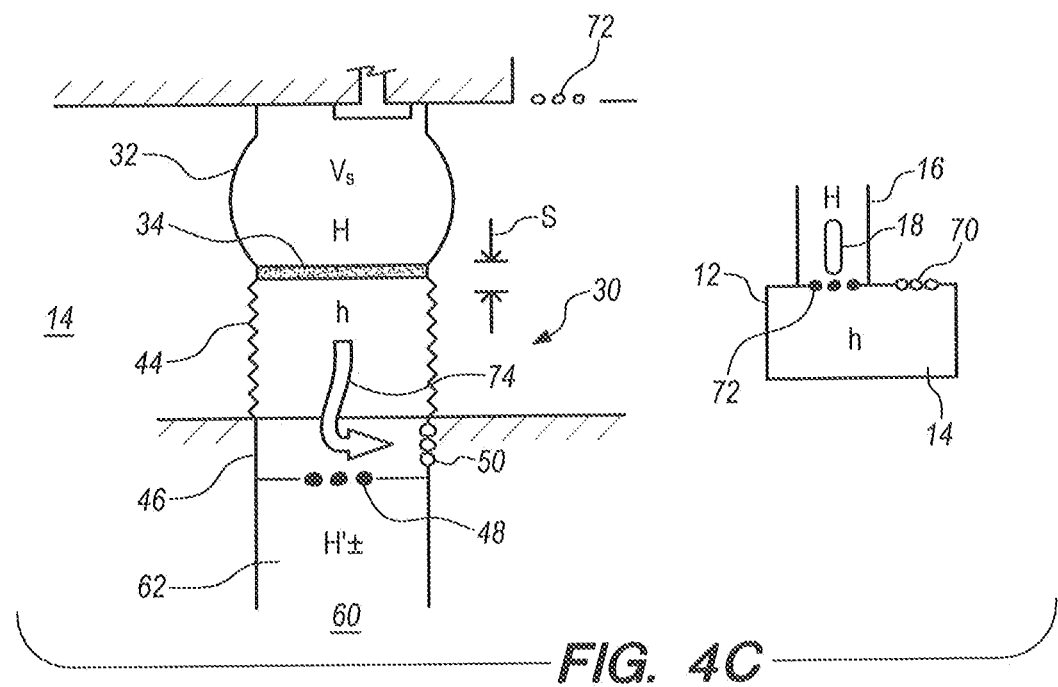

The understanding of an operation for the displacement device 30 will be best appreciated by first considering the sequence of side drawings which are shown respectively in a FIGS. 4A-C. In the side drawing of FIG. 4A, a module 18 is shown immediately after it enters the lower tank 14. At this point, an access valve 70 is CLOSED behind the module 18 and a transfer valve 72 ahead of the module 18 is OPEN. In this configuration, water pressure in the bi-level tank 12 will equal H. In the side drawing of FIG. 48, the module 18 is shown, still in the lower tank 14, but positioned to enter the upper tank 16. The side drawing of FIG. 4C then shows conditions in the bi-level tank 12 after the module 18 exits the lower tank 14 and has entered the upper tank 16. Note: it is only after the module 18 has exited the lower tank 14, and the transfer valve 72 is CLOSED, that the access valve 70 is OPEN to receive the next module 18 (not shown) in sequence. Importantly, to receive the next module 18, with the access valve OPEN, the water pressure in the lower tank 14 has lowered from H to a single atmospheric head height "h".

With reference back to FIG. 4A, the displacement device 30 is shown configured at a time $t_0$ to begin a displacement device 30 duty cycle $\Delta t$. For this configuration, at the time $t_0$ the exhaust valve 50 of the exhaust chamber 46 is CLOSED and the pressure valve 48 is OPEN. The consequence of this is that a pulse of compressed air 74 (shown as an arrow) enters the bellows 44 from the receiver tank 60 via the conduit 62, at a pressure H'±. As disclosed above, H'±>H. Thus, the resultant pressure differential causes the piston plate 34 to be moved upwardly through the distance s.

FIG. 4B shows the displacement device at a time $t_1$ in the duty cycle $\Delta t$. At the time $t_1$, the piston plate 34 has been raised through the distance s, and through a volume equal to $sA=V_m$. Two important changes in the configuration of the displacement device 30 have occurred between the times $t_0$ and $t_1$ which are particularly noteworthy. For one, the skirt 32 has been radially expanded. In effect, this expansion displaces a volume of water equal to $sA=V_m$ in the lower tank 14. For another, the pressure valve 48 is CLOSED at the time $t_1$. Indeed, both the pressure valve 48 and the exhaust valve 50 need to be held CLOSED at the same time during the interval of time from $t_1$ to $t_2$. The reason here is that between the times $t_1$ and $t_2$ the piston plate 34 must be held stationary, and not lowered, until after the module 18 has cleared the transfer valve 72 and is completely inside the upper tank 16. It is important to note that between $t_1$ and $t_2$, while the piston plate 34 is held stationary, no work is done.

As shown in FIG. 4C, at the time $t_2$ in the duty cycle $\Delta t$ of the displacement device 30, the exhaust valve 50 is OPEN while the pressure valve 48 remains CLOSED. With the exhaust valve 50 OPEN, and the pressure valve 48 CLOSED, the pulse of air 74 under the piston plate 34 is exhausted into the atmosphere. As this pulse of air 74 is exhausted from the exhaust chamber 46, the effect is for air pressure under the piston plate 34 to immediately lower from the pressure H'± to the much lower atmospheric pressure h at the time $t_3$. In review, it is important to note that the piston plate 34 essentially does no work from the time $t_1$ to the time $t_3$ in the duty cycle $\Delta t$ of the displacement device 30.

Figure 5:
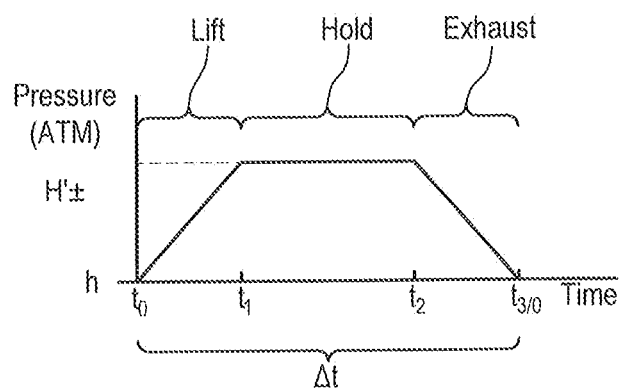
FIG. 5 is a graph of the pressure profile of compressed air against the underside surface of the piston plate during a displacement device duty cycle Δt.

For a review of the air pressures against the underside 42 of the piston plate 34, FIG. 5 shows the variations in these air pressures during a duty cycle $\Delta t$ of the displacement device 30. With reference to FIG. 5, recall that the duty cycle $\Delta t$ begins at to when the module 18 enters the lower tank 14 and pressure in the tank equals h. The work portion of the duty cycle $\Delta t$ extends only during the time between to and $t_1$ while the piston plate 34 is being raised to lift a volume of water equal to $sA=V_m$. It is this lifting action that causes the skirt 32 to expand radially and thereby displace the volume of water equal to $sA=V_m$. In this action, the skirt 32 is merely an intermediary that functions to transfer a predetermined volume of compressed air from the receiver tank 60 into a displacement volume of water in the lower tank 14. In this transfer, the work done by the piston plate 34 merely reconfigures the skirt 32 for its intended purpose. It is with this reconfiguration that a volume of water equal to $sA=V_m$ is displaced from the lower tank 14 into the upper tank 16. It must be appreciated that all of the work done between the receiver tank 60 and the lower tank 14 begins at the air compressor 58.

Figure 6A:
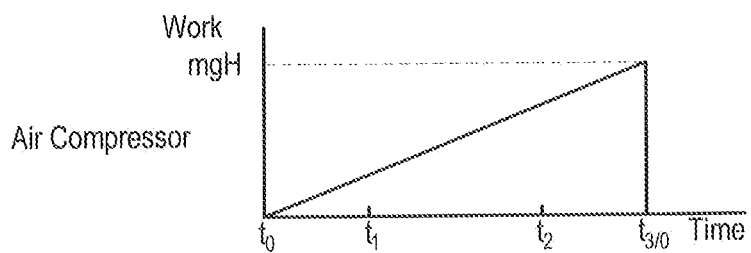
FIGS. 6A-6C show the respective power requirements for work done during a displacement device duty cycle Δt, namely, work done by the air compressor to maintain a pressure H'± in the receiver tank (FIG. 6A), work required by the piston plate to lift a predetermined volume of water $\Delta V_w$ (FIG. 6B), and the work harvested from a power module (FIG. 6C)
Figure 6B:
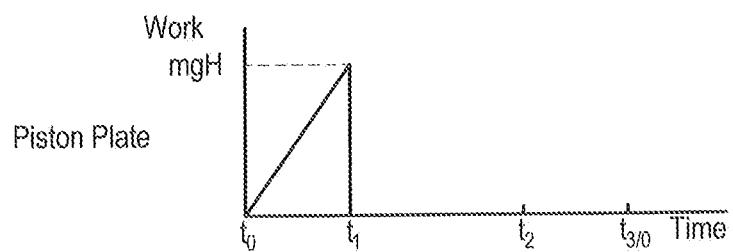
Figure 6C:
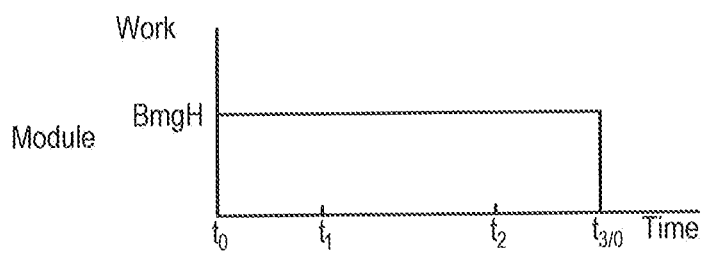

A breakdown of the work done by individual components of the displacement device 30 is shown sequentially in FIGS. 6A-C. With cross reference back to FIG. 5, FIG. 6A shows that the air compressor 58 effectively works continuously during the duty cycle $\Delta t$, starting from the time $t_0$ and ending at the time two, wherein the subscript 3/0 is used to indicate the end of one duty cycle $\Delta t$ and the beginning of the next sequential duty cycle $\Delta t$. During this time, the air compressor 58 does mgH worth of work with an input power 66 equal to mgH/$\Delta t$.

FIG. 6B shows that the piston plate 34 also does mgH worth of work. But the piston plate 34 does all of its work within a portion 1/x of the work cycle $\Delta t$ at a power equal to mgH/1/x$\Delta t$. With reference to FIG. 6C, it is seen that during a duty cycle $\Delta t$ the module 18 has been engaged with the linear generator 24. Considering its buoyancy factor B, the module 18 has generated an output power 68 equal to BmgH/$\Delta t$.

A power comparison between the output power 68 and the input power 66 of the Machine 10 will be best appreciated by considering when specific power that is, and is not, required during the duty cycle $\Delta t$.

At the time $t_0$, the start time of a duty cycle $\Delta t$, the receiver tank 60 of the displacement device 30 holds compressed air at a pressure H'±. With the pulsing of a volume of compressed air $V_c$ from the receiver tank 60 during the first interval 1/x$\Delta t$, the power to raise the piston plate 34 is equal to mgH/$\Delta t$. After the first pulse, however, no more work is done by the piston plate 34 for the remainder of the duty cycle $\Delta t$. It is important to remember that the work % mgH has been done by the air compressor 58 during each interval &at within the duty cycle $\Delta t$. On the other hand, from a power perspective, during the entire duty cycle $\Delta t$, the piston plate 34 receives an input power 66 from the receiver tank 60 that is equal to mgH/$\Delta t$. Stated differently, the piston plate 34 does the same amount of work, mgH, during the pulse, 1/x$\Delta t$, as it does during the entire duty cycle $\Delta t$. Accordingly, the input power 66 requirement from the receiver tank 60 for the Machine 10 can be compared with 1/xmgH/1/x$\Delta t$.

Figure 7:
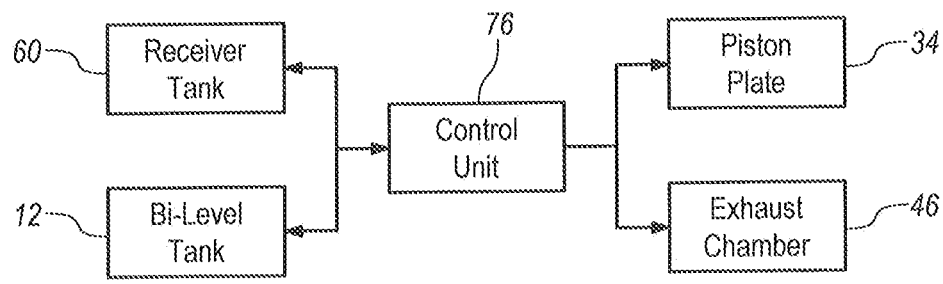
FIG. 7 is a diagram of the Machine components that are monitored and operated by a control unit for the present invention.

With reference to FIG. 7, an operation of the Machine 10 is controlled by a control unit 76. As shown for this purpose, the control unit 76 is electronically connected with the receiver tank 60, the exhaust chamber 46, and the piston plate 34, to provide the input power 66 for the input energy system 54 of the Machine 10. Specifically, the control unit 76 is connected in a two-way communication with the receiver tank 60 and the air compressor 58 to thereby maintain a compressed air pressure of H'± in the receiver tank 60 during successive duty cycles $\Delta t$. Further, the control unit 76 provides direct control over the pressure valve 48 and the exhaust valve 50 of the exhaust chamber 46. Also, the control unit 76 provides direct control over the piston plate 34, via the exhaust chamber 46, to coordinate an operation of the displacement device 30 with an operation of the bi-level tank 12.

FIG. 7 also shows that the control unit 76 is in two-way communication with the bi-level tank 12, primarily for the purpose of monitoring the transit of a power module 18 along the air/water pathway 20. More specifically, by monitoring movements of the piston plate 34, and its movements that determine the duty cycle $\Delta t$ of the displacement device 30, the control unit 76 controls the respective water levels of the lower tank 14 and the upper tank 16. With this control, the output power 68 is maintained for the input energy system 54.

While the particular Energy Balanced System for Generating Electric Power as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An apparatus for moving water in a water tank which comprises:
    a piston plate having an upper surface and an underside, wherein the piston plate defines a perimeter surrounding a flat plate area A on the upper surface of the piston plate;
    a flexible enclosure submerged in the water tank for holding a volume of water within the enclosure at a predetermined pressure H, wherein the enclosure has an opening attached to the perimeter of the piston plate to surround the area A on the upper surface of the piston plate, wherein the enclosure is stabilized against a stationary structure inside the water tank at a predetermined distance from the upper surface of the piston plate, and wherein the enclosure defines an axis perpendicular to the piston plate;
    a cylindrical shaped bellows surrounding a hollow chamber between a first open end and a second open end of the bellows, wherein the first end of the bellows is attached to the perimeter of the piston plate to surround an area A on the underside of the piston plate;
    a receiver tank for maintaining compressed air at a pressure in a range H'±, wherein H'± is greater than the pressure H in the enclosure;
    an exhaust chamber connected between the bellows and the receiver tank, wherein the exhaust chamber has a pressure valve for controlling fluid communication between the exhaust chamber and the receiver tank and an exhaust valve for controlling fluid communication between the exhaust chamber and the atmosphere; and
    a control unit connected to the pressure valve and to the exhaust valve of the exhaust chamber for a sequential valve operation of a first configuration wherein the pressure valve is OPEN and the exhaust valve is CLOSED to introduce a pulse of compressed air from the receiver tank into the chamber for moving the piston plate in a first direction to radially expand the enclosure outwardly from the axis, a second configuration wherein both the pressure valve and the exhaust valve are closed to hold the piston plate stationary, and a third configuration wherein the pressure valve remains CLOSED and the exhaust valve is OPEN to exhaust compressed air from the exhaust chamber and into the atmosphere to collapse the enclosure and move the piston plate in a second direction to begin another sequential valve operation.

2. The apparatus of claim 1 wherein at least the flexible enclosure is submerged in the water tank, wherein the work performed by the piston plate during the first valve configuration is mgH, wherein m is the mass of a predetermined volume of water, $V_w$, in the water tank, g is the influence of gravity, and H is a pressure head height of water in the water tank.

3. The apparatus of claim 2 wherein the sequential valve operation is determined by movements of the piston plate during a defined duty cycle $\Delta t$, and the duty cycle $\Delta t$ comprises:
    a first phase between a time $t_0$ and a time $t_1$ for the first valve configuration;
    a second phase between the time $t_1$ and a time $t_2$ for the second valve configuration; and
    a third phase between the time $t_2$ and a time $t_3$ for the third valve configuration.

4. The apparatus of claim 3 wherein, as a portion of the duty cycle $\Delta t$, the first phase is equal to $1/x\Delta t$, wherein the work required to be performed by the piston plate during the entire duty cycle $\Delta t$ is $mgH/\Delta t$, while the actual work performed by the piston plate during the second phase and the third phase is zero.

5. The apparatus of claim 4 wherein the power to operate the piston plate during the duty cycle $\Delta t$ is equal to $1/xmgH/\Delta t$.

6. The apparatus of claim 5 wherein the work done by the piston plate during the first phase is provided by a pulse of compressed air from the receiver tank.

7. The apparatus of claim 6 further comprising an air compressor for maintaining air pressure in the receiver tank within a range H'± during the duty cycle $\Delta t$, and wherein H'± is greater than H.

8. The apparatus of claim 7 wherein the flexible enclosure is made of a non-stretchable, liquid impervious material.

9. The apparatus of claim 5 wherein the apparatus is an input power system for driving an output power system, and the output power system comprises:
    a bi-level tank having an upper tank with an upper water level and a lower tank having a lower water level;
    a linear generator; and
    a power module having a buoyancy factor B, wherein the power module falls through air from an elevated start point under the influence of gravity and engages with the linear generator to generate electricity before falling into the lower tank where it decelerates for a return through the upper tank under the influence of its buoyancy to return the power module to the elevated start point to begin another duty cycle $\Delta t$, and wherein the power generated by the power module during the duty cycle $\Delta t$ is equal to BmgH.

10. The apparatus of claim 9 wherein the output power BmgH of the output power system is compared with the input power $1/xmgH/\Delta t$ of the input power system to determine an efficiency for generating electricity.

* * * * *

UNITED STATES PATENT AND TRADEMARK OFFICE
CERTIFICATE OF CORRECTION

PATENT NO. : 11,268,487 B1
APPLICATION NO. : 17/118012
DATED : March 8, 2022
INVENTOR(S) : Neil K. Nydegger et al.

It is certified that error appears in the above-identified patent and that said Letters Patent is hereby corrected as shown below:

In the Specification

Column 3 Line 7 and Line 29 in the formula, 'λt' and 'At' should be changed to --$\Delta t$--

Column 3 Line 16 'mw' should be changed to --$m_w$--

Column 7 Line 53 'Ve' should be changed to --Vs--

Column 8 Line 66 'FIG. 48' should be changed to --FIG. 4B--

Column 9 Lines 56 and 58 'to' should be changed to --$t_o$--

Column 10 Line 11 'two' should be changed to --$t_{3/0}$--

Column 10 Line 33 'mgH/$\Delta$t' should be changed to --mgH/1/X$\Delta$t--

Column 10 Line 35 '% mgH' should be changed to --1/XmgH--

Column 10 Line 37 '&at' should be changed to --1/X$\Delta$t--

Signed and Sealed this
Thirty-first Day of May, 2022

Katherine Kelly Vidal
*Director of the United States Patent and Trademark Office*